US010218950B2

(12) United States Patent
Sporn et al.

(10) Patent No.: US 10,218,950 B2
(45) Date of Patent: Feb. 26, 2019

(54) METHOD AND APPARATUS FOR PROJECTING IMAGES ON ARTIFICIAL WINDOWS

(71) Applicant: ARWAV Inc., Melville, NY (US)

(72) Inventors: Joseph S Sporn, New York, NY (US); Steven Thomas, Mount Vernon, NY (US)

(*) Notice: Subject to any disclaimer, the term of this patent is extended or adjusted under 35 U.S.C. 154(b) by 166 days.

(21) Appl. No.: 15/344,300

(22) Filed: Nov. 4, 2016

(65) Prior Publication Data

US 2018/0131914 A1   May 10, 2018

(51) Int. Cl.
| | |
|---|---|
| *G09G 5/00* | (2006.01) |
| *H04N 9/31* | (2006.01) |
| *G06F 3/042* | (2006.01) |
| *G09G 3/00* | (2006.01) |

(52) U.S. Cl.
CPC ......... *H04N 9/3185* (2013.01); *G06F 3/0425* (2013.01); *G06F 3/0428* (2013.01); *G09G 3/002* (2013.01); *H04N 9/317* (2013.01); *H04N 9/3147* (2013.01)

(58) Field of Classification Search
CPC .......... G09G 3/025; G09G 3/02; G09G 3/346; G09G 3/002; G06F 3/011; G06F 3/017; G06F 3/0425; G06F 3/0428
See application file for complete search history.

(56) References Cited

U.S. PATENT DOCUMENTS

| | | | | |
|---|---|---|---|---|
| 6,431,711 | B1 * | 8/2002 | Pinhanez | G03B 21/28 348/E5.137 |
| 7,290,889 | B2 * | 11/2007 | Ullmann | H04N 5/74 348/E5.137 |
| 8,882,276 | B2 * | 11/2014 | Nordgard-Hansen | G03B 21/16 348/748 |
| 2002/0105623 | A1 * | 8/2002 | Pinhanez | G03B 21/28 353/69 |
| 2010/0188587 | A1 * | 7/2010 | Ashley | G06F 3/0346 348/744 |
| 2013/0229632 | A1 * | 9/2013 | Nordgard-Hansen | G03B 21/16 353/58 |
| 2014/0172557 | A1 * | 6/2014 | Eden | G06F 3/0488 705/14.49 |

* cited by examiner

*Primary Examiner* — Vijay Shankar

(74) *Attorney, Agent, or Firm* — Hanes & Bartels LLC

(57) ABSTRACT

A method of creating a plurality of simulated window views on an interior surface of a building including defining the area on the surface that will be shown as window views and with a plurality of short throw video projectors hung from the ceiling provide a mapped video recording of an image to be viewed in the window areas where the mapped video recording creates discrete segments of the total view assigned to separate ones of the window areas and projecting the discrete segments on the window areas to create a total view of the selected image, such as a landscape.

3 Claims, 3 Drawing Sheets

METHOD AND APPARATUS FOR PROJECTING IMAGES ON ARTIFICIAL WINDOWS

The present invention relates generally to a method and apparatus for creating artificial windows on the interior surface of a building.

BACKGROUND

Using video projection to create the illusion of a scene through a window on a blank wall has been the subject of several prior art publications. In U.S. Pat. No. 5,252,051 to McManigal a single artificial window is disclosed having a video source which displays a video image on a CRT screen that changes with the position of the viewer. Published Patent Application No. US2015/0215567 to Mark International discloses a system and method for generating a television display in a simulated window frame supplemented by full spectrum lighting to mimic sunlight and short wavelength lighting both emitted from a bezel around the display screen to treat seasonal affective disorder.

These prior art devices and others are limited to recreating a single window with a limited view and limited purpose whereas the primary object of the present invention is to provide a system and method that simulates an array of windows though which a viewer sees the image of an expansive scene that is sequentially allocated to each of a plurality of windows. Such a system is particularly adapted to large meeting rooms and normally secluded rooms such as are found in funeral homes. Depending on the purpose and the mood to be created, the system of the present invention has more to offer in many situations than actual windows. For example, gloomy outdoor weather can be replaced with an artificial window view of a bright sunny day. A dramatic mountain scene can be substituted for the hectic traffic vista of a real window facing a downtown location. Peaceful and meditative moods can actually be produced by the properly chosen and displayed video to simulate a certain scene viewed through a plurality of artificial windows.

SUMMARY OF THE INVENTION

A method for creating a plurality of simulated window views on an interior surface of a building including the defining of an array of spaced apart window dimensioned areas on a wall surface that will simulate actual windows, providing short throw video projector in the ceiling of the room proximate to each of the simulated windows, mapping a video of the chosen image to be viewed through the window to create discrete segments of the video to be assigned to separate ones of the array of simulated windows and directing the mapped video segments to the projectors in proximity to the simulated window to which the video segment is assigned.

DETAILED DESCRIPTION

Figure 1:
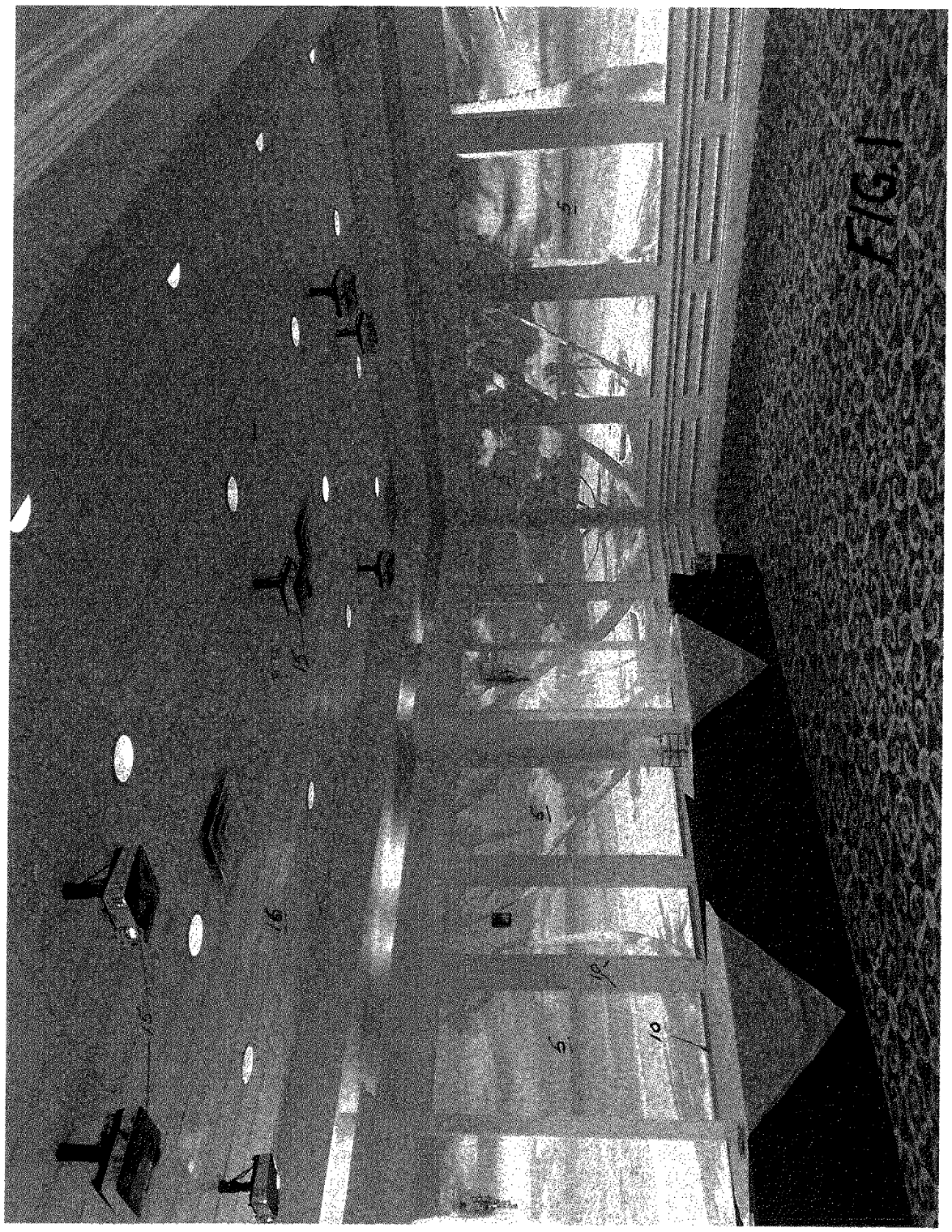
FIG. 1 is a perspective view of an exemplary room having a plurality of artificial windows created by projectors mounted from the ceiling of the room.
Figure 2:
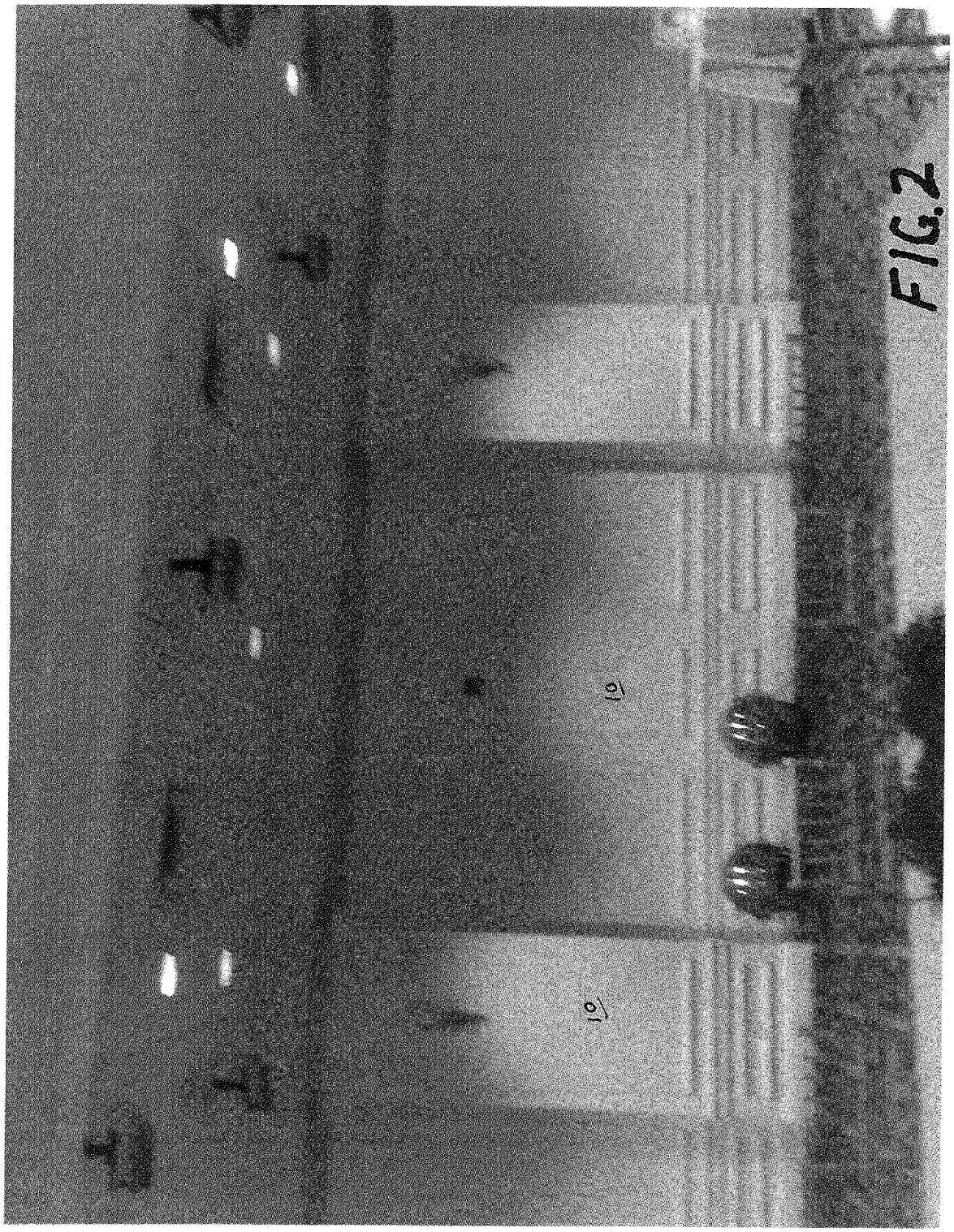
FIG. 2 is a front view of a wall prepared with framing of the areas selected to be the simulated windows
Figure 3:
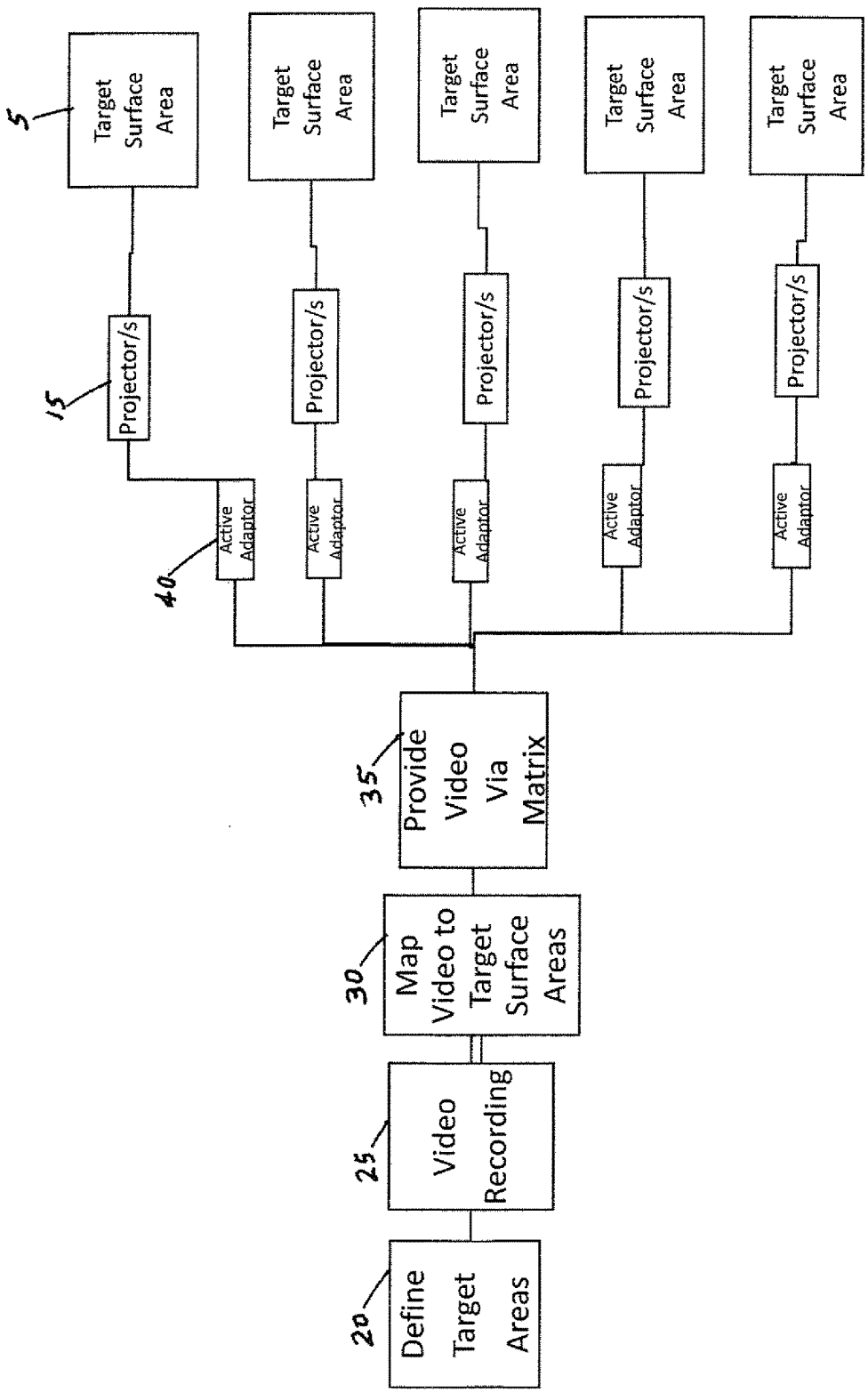
FIG. 3 is a block diagram of the method and apparatus of the present invention.

FIG. 1 illustrates an exemplary room equipped with the simulated windows 5 of the present invention. Preferably, the wall on which the simulated window will appear contains traditional wall trim window frames 10 that outline the area to be simulated for improving the sense of reality. A series of short throw video projectors 15 are hung from the ceiling 16 of the room, each in proximity to the particular window area 5 to which the video segment from a projector will be projected. A preferred projector for the purpose is the Epson 535W Short Throw with 3400 lumens. Short throw projectors mounted close to the wall are preferred in order to minimize the chances of a person coming between the projector and the window area 5. In the exemplary room of FIG. 1 the palm tree and beach scene is mapped into sequential segments so that each of the plurality of simulated windows depicts a separate portion of the total wide angle view of the beach.

In terms of a process for practicing the invention the first step is to create the window dimensioned areas of one or more of the walls of a building 20. This a accomplished by constructing actual window trim 10 on the wall at the intended location of the simulated window, which will also be the target area for a projected segment of a video recording.

The chosen scene for the simulated windows is reduced to a video recording 25 of the scene. The video is processed by traditional video mapping software 30 such as, for example, ArKaos Media Master Pro 4, to separate the total video into sequential segments that are each assigned to the various projectors for creating the visual image of that segment in the target area within the specific window frame on the wall.

The mapped video is stored on the hard drive of a computer or similar memory device and when activated routes the recording to a video matrix map 35 which communicates the video segment through a video card and active adapter 40 to the one or two projectors 15 necessary to display the segment 5 that is congruent with the frame 10.

We claim:

1. A method for creating a plurality of simulated window views on an interior surface of a building comprising the steps of:
   define an array of spaced apart window dimensioned areas on the surface that will simulate actual windows,
   provide at least one short throw video projector in close proximity to each of the simulated windows,
   provide a video recording of an image to be viewed on the array,
   map the video recording to create discrete segments of the video recording assigned to separate ones of the array of simulated windows,
   direct the mapped video segments to the at least one projector in proximity to the simulated window to which the video segment is assigned.

2. A method of creating a plurality of simulated window views on an interior surface of a building comprising the steps of:
   define a plurality of target areas on the surface,
   provide a video projector in close proximity to each one of the target areas,
   provide a video recording of an image to be viewed on the target areas,
   map the video recording to create discrete segments thereof assigned to separate ones of the plurality of target area, direct the mapped video recording to the projector in proximity to the target area to which the video segment is assigned.

3. A system for creating images in artificial windows comprising,
- a plurality of window defined areas on an interior surface of a building,
- a video image,
- means for mapping the video image for creating discrete segments thereof assigned to separate ones of the plurality of window defined areas,
- electronic memory for storing the mapped video,
- at least one video projector disposed proximate to each of the window defined areas, and
- means for interconnecting the stored video image to the projector for projecting the mapped image into each of the window defined areas.

* * * * *